US 11,989,162 B2

United States Patent
Ganesh et al.

(10) Patent No.: US 11,989,162 B2
(45) Date of Patent: May 21, 2024

(54) SYSTEM AND METHOD FOR OPTIMIZED PROCESSING OF INFORMATION ON QUANTUM SYSTEMS

(71) Applicant: Mphasis Limited, Bangalore (IN)

(72) Inventors: Jai Ganesh, Bangalore (IN);
Udayaadithya Avadhanam, Bangalore (IN); Nachiket Kare, Nashik (IN);
Ashutosh Vyas, Jaipur (IN);
Rajendrakumar Premnarayan Mishra, Thane (IN); Rohit Kumar Patel, Bangalore (IN)

(73) Assignee: Mphasis Limited (IN)

( * ) Notice: Subject to any disclaimer, the term of this patent is extended or adjusted under 35 U.S.C. 154(b) by 322 days.

(21) Appl. No.: 17/478,287

(22) Filed: Sep. 17, 2021

(65) Prior Publication Data
US 2022/0092035 A1    Mar. 24, 2022

(30) Foreign Application Priority Data

Sep. 18, 2020  (IN) .............................. 202041040408

(51) Int. Cl.
*G06N 20/00*    (2019.01)
*G06F 16/178*   (2019.01)
*G06N 10/00*    (2022.01)

(52) U.S. Cl.
CPC ......... *G06F 16/1794* (2019.01); *G06N 10/00* (2019.01); *G06N 20/00* (2019.01)

(58) Field of Classification Search
None
See application file for complete search history.

(56) References Cited

U.S. PATENT DOCUMENTS

2022/0414492 A1* 12/2022 Jezewski .................. G06N 5/04

OTHER PUBLICATIONS

Kllloran. Oct. 2019. Continuous-variable quantum neural networks.*
Kumar. Jul. 2020. Supervised Learning Using a Dressed Quantum Network with "Super Compressed Encoding": Algorithm and Quantum-Hardware-Based Implementation.*
Kumar, S. et al., "Supervised Learning Using a Dressed Quantum Network with "Super Compressed Encoding": Algorithm and Quantum-Hardware-Based Implementation", arxiv.org, Cornell University Library, Jul. 20, 2020 (Jul. 20, 2020). XP081724237.

* cited by examiner

*Primary Examiner* — Tuankhanh D Phan
(74) *Attorney, Agent, or Firm* — Lerner David LLP (57) ABSTRACT

The present invention provides for a system and a method for improved representation of classical data on quantum systems. Input classical data is received and a feature set is created from the classical data. A functional transformation is performed on the created feature set to reduce high dimensional data associated with the feature set and a low dimensional feature space dataset is generated. A feature space transformation is performed on the low-dimensional feature space dataset to obtain a new feature space dataset with enhanced feature representation of the low-dimensional feature space dataset in a multi-dimensional space. The new feature space dataset results in optimal mapping of the input classical data into a quantum format. The new feature space dataset is sampled and batches of the sampled dataset are selected. The sampled dataset is mapped into an optimized quantum format for loading the sampled dataset into quantum states.

38 Claims, 4 Drawing Sheets

SYSTEM AND METHOD FOR OPTIMIZED PROCESSING OF INFORMATION ON QUANTUM SYSTEMS

FIELD OF THE INVENTION

The present invention relates generally to the field of information processing, and more particularly, the present invention relates to a system and a method for optimized processing of information on quantum systems.

BACKGROUND OF THE INVENTION

Nowadays, quantum computational systems (quantum systems) are increasingly in demand in the domain of information processing due to computational efficiencies afforded by such systems. Applying classical quantum principles on physical systems and learning systems is an emerging technological area and there is a demand in adopting these principles for processing classical data. The inherent nature of quantum systems to converge to low energy states has been found to not only accelerate information processing tasks but also aid in obtaining optimal solutions.

Conventionally, Quantum Assisted Machine Learning (QAML) is a hybrid classical-quantum architecture that uses quantum algorithms for machine learning tasks which include classification, prediction, forecasting etc. This hybrid architecture combines self-learning of parameters from classical machine learning with optimization using quantum principles. Quantum technologies have the potential to overcome limits of machine learning algorithms such as requirement of huge number of parameters to be trained, data sensitive nature of models, and not very efficient algorithms to reach global optimal solutions.

However, it has been observed that conventional techniques of loading classical data into quantum systems and subsequent computation of the data is fraught with a number of drawbacks. The techniques used for representing classical data on quantum systems influence design and efficiency of quantum circuits in quantum computational systems. Typically, classical data is loaded on quantum computational systems as input by employing data encoding techniques whereby the classical data are typically encoded into quantum formats i.e. in the form of quantum bits (qubits) or in the form of amplitudes. It has been observed that conventional methods of loading classical data in quantum systems requires higher qubits to represent high-dimensional data which results in a bottleneck and high computational overhead for data encoding task. Further, carrying out machine learning tasks in quantum systems that involve large set of features and huge volume of data requires very difficult and complex data encoding tasks for expressing classical data in quantum systems.

In light of the above drawbacks, there is a need for a system and a method which provides for optimized processing of information on quantum systems. There is a need for a system and a method for expressing data on quantum systems which results in lower information loss, faster convergence, and optimized solutions.

SUMMARY OF THE INVENTION

In various embodiments of the present invention, a system for improved representation of classical data on quantum systems is provided. The system comprises a memory storing program instructions and a processor executing program instructions stored in the memory. The system comprises a feature definition engine configured to receive input classical data and create a feature set from the classical data. Further, the system comprises a feature space transformation engine configured to perform a functional transformation on the created feature set to reduce high dimensional data associated with the feature set. The feature space transformation engine is configured to generate a low dimensional feature space dataset and perform a feature space transformation on the low-dimensional feature space dataset to obtain a new feature space dataset with enhanced feature representation of the low-dimensional feature space dataset in a multi-dimensional space where the new feature space dataset results in optimal mapping of the input classical data into a quantum format. The system further comprises a batch preparation and selection engine configured to optimally sample the new feature space dataset and select batches of the sampled dataset. Yet further, the system comprises a quantum prediction engine configured to map the received batches of sampled dataset into an optimized quantum format for loading the sampled dataset into quantum states.

In various embodiments of the present invention, a method for improved representation of classical data on quantum systems executed by a processor executing program instructions stored in a memory is provided. The method comprises receiving input classical data and creating a feature set from the classical data. The method further comprises performing a functional transformation on the created feature set to reduce high dimensional data associated with the feature set and generate a low dimensional feature space dataset. Further, the method comprises performing a feature space transformation on the low-dimensional feature space dataset to obtain a new feature space dataset with enhanced feature representation of the low-dimensional feature space dataset in a multi-dimensional space where the new feature space dataset results in optimal mapping of the input classical data into a quantum format. Yet further, the method comprises sampling the new feature space dataset and selecting batches of the sampled dataset. Finally, the method comprises mapping the received batches of sampled dataset into an optimized quantum format for loading the sampled dataset into quantum states.

In various embodiments of the present invention, a computer program product is provided. The computer program product comprises a non-transitory computer readable medium having computer-readable program code stored thereon, the computer readable program code comprising instructions that, when executed by a processor, cause the processor to receive input classical data and creating a feature set from the classical data. A functional transformation is performed on the created feature set to reduce high dimensional data associated with the feature set and generate a low dimensional feature space dataset. A feature space transformation is performed on the low-dimensional feature space dataset to obtain a new feature space dataset with enhanced feature representation of the low-dimensional feature space dataset in a multi-dimensional space where the new feature space dataset results in optimal mapping of the input classical data into a quantum format. The new feature space dataset is sampled and batches of the sampled dataset are selected and received batches of sampled dataset are mapped into an optimized quantum format for loading the sampled dataset into quantum states.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
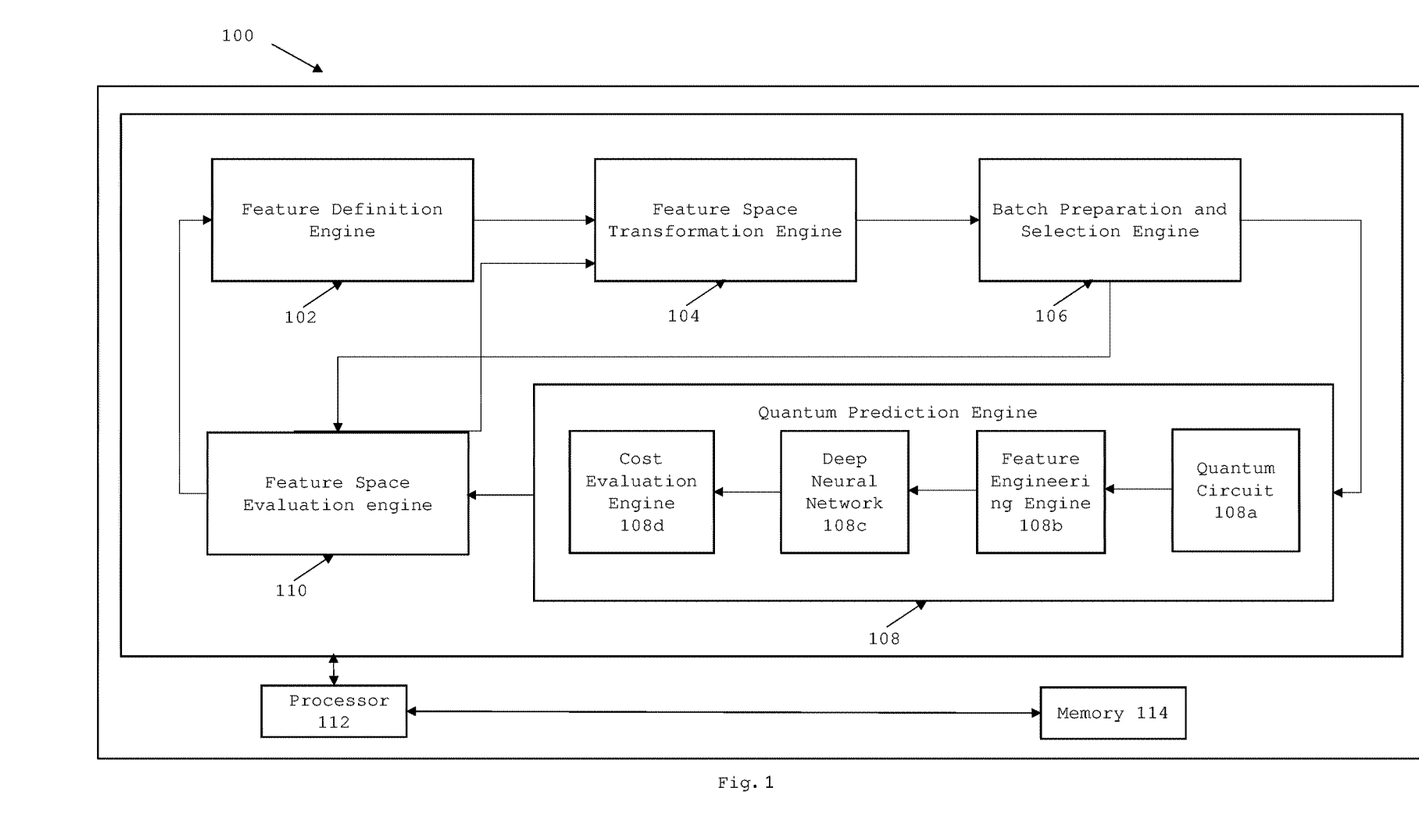
FIG. 1 is a block diagram of a system for optimized processing of information on quantum systems, in accordance with an embodiment of the present invention.

FIG. 1 is a block diagram of a system 100 for optimized processing of information on quantum systems, in accordance with various embodiments of the present invention. The system 100 has multiple units which work in conjunction with each other for optimized processing of information on quantum systems. In an embodiment of the present invention, the system comprises a feature definition engine 102, a feature space transformation engine 104, a batch preparation and selection engine 106, and a feature space evaluation engine 110. Further, the system 100 comprises a quantum system referred to as a quantum prediction engine 108. The system 100 is operated via a processor 112 specifically programed to execute instructions stored in a memory 114 for executing respective functionalities of units of the system 100 in accordance with an embodiment of the present invention.

In an embodiment of the present invention, the system 100 may be implemented in a cloud computing architecture in which data, applications, services, and other resources are stored and delivered through shared data-centers. In an exemplary embodiment of the present invention, the functionalities of the system 100 are delivered to a user as software as a service (SaaS) over a communication network. The communication network may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

In another embodiment of the present invention, the system 100 may be implemented as a client-server architecture. In said embodiment of the present invention, a client terminal accesses a server hosting the system 100 over a communication network. The client terminals may include but are not limited to a smart phone, a computer, a tablet, microcomputer, a graphical user interface (GUI), an application programming interface (API) or any other wired or wireless terminal. The server may be a centralized or a decentralized server.

In various embodiments of the present invention, the system 100 is configured to create an enhanced feature space for an improved representation of classical data on quantum systems for optimized processing for carrying out predictive tasks by the quantum prediction engine 108. In an embodiment of the present invention, the system 100 is configured to represent classical data on a lower dimensional feature space in the quantum systems which aids in optimized processing of information on quantum systems for predictive tasks. Examples of quantum systems may include a near-term quantum device and/or a quantum simulator.

In an embodiment of the present invention, the feature definition engine 102 of the system 100 is configured to receive classical data as an input and create feature sets for further processing. In an exemplary embodiment of the present invention, the classical data received is in the form of images. The feature definition engine 102 receives the image data and converts the image data into an array of pixels. The array of pixels is generated by extrapolating pixel values from the received image. The feature definition engine 102 then processes the array of pixels by transforming the pixels through rescaling and converting the pixels to a grayscale. Further, feature definition engine 102 processes the transformed pixels by flattening the pixel arrays. In an exemplary embodiment of the present invention, the flattening of pixel array constitutes a series of operations including, but are not limited to, normalization of pixel information and logarithmic transformation of pixels, binarization of pixels. The feature definition engine 102 then creates a feature set based on an analysis of the pixel values that represent various attributes of the image. In another exemplary embodiment of the present invention, the classical data may include features extracted from machine learning tasks such as deep neural networks, clustering algorithms etc. and the feature definition engine 102 is configured to create the feature set by processing the extracted features received as classical data. In an example embodiment, the extracted features from machine learning tasks may include features related to images.

In yet another exemplary embodiment of the present invention, the classical data received is in the form of text data. The feature definition engine 102 receives the text data and creates a feature set by converting the text data into a numeric type using word embedding. The word embedding is performed by assigning random numerical values to elements of the text data and a machine learning or deep learning model is used to identify relation between the numerical values in the context of usage of text elements in the input data. The text elements are then represented by numerical values and association between the numerical values and the text elements is learnt by a machine learning or deep learning model using trainable weights. In an exemplary embodiment of the present invention, the text elements may be words, sentences, phrases and strategies used to learn embedding including, but are not limited to, bag-of-word approach and skip-gram approach.

In an embodiment of the present invention, the feature definition engine 102 of the system 100 is configured to de-noise the created feature set for removing unwanted noisy data, sharp edges and blurry pixels from the feature set. Feature de-noising is carried out to refine the created feature set to suit predictive tasks performed by the quantum prediction engine 108, in accordance with an embodiment of the present invention. In various exemplary embodiments of the present invention, feature de-noising may include techniques such as, thresholding, filtering, discretizing, etc. In various exemplary embodiments of the present invention, the feature definition engine 102 may include de-noising auto-encoders, signal de-noising algorithms, deep convolutional networks for carrying out de-noising of the created feature set. The output of the feature definition engine 102 is a created feature set which includes salient and discriminative characteristics.

In an embodiment of the presented invention, the created feature set is received as an input by the feature space transformation engine 104 from the feature definition engine 102. The feature space transformation engine 104 is configured to generate a low-dimensional dataset from the received feature set and transform the low-dimensional dataset into a new enhanced feature set.

In an embodiment of the present invention, the feature space transformation engine 104 performs a functional transformation on the created feature set by deriving abstract features of low-dimensional feature space from the created feature set. In various exemplary embodiments of the present invention, various techniques such as, but not limited to, feature manifold learning, kernel methods, and response based techniques may be employed by the feature space transformation engine 104 for performing functional transformation on the created feature set. In various embodiments of the present invention, feature space transformation engine 104 performs functional transformation to reduce a high-dimensional data associated with the feature set to a low-dimensional feature space dataset without loss of information. In an exemplary embodiment of the present invention, the feature space transformation engine 104 obtains the transformed low-dimensional feature space dataset by approximating the distribution of data of the high-dimensional data associated with the created feature set. The approximation of the distribution of data is carried out based on specific predictive tasks which is to be carried out by the quantum prediction engine 108. Advantageously, the low-dimensional feature space dataset helps in improving efficiency of the quantum system by reducing the dimensionality of dataset and compressing the dataset. Based upon objective of the tasks associated with the quantum circuit 108*a* of the quantum prediction engine 108, dimensionality reduction is carried out by strategic learning and by approximating the high-dimensional data distribution. For example, if non-linearity in data is high, then methods such as, but not limited to, kernel methods, manifold learning methods are used to reduce the dimensionality. On the other hand, if the linearity is high then methods like, but not limited to, principle component analysis, multi-correspondence analysis, multifactor analysis may be used to support learning efficiency of quantum circuit 108*a* to reduce the dimensionality.

In an embodiment of the present invention, subsequent to obtaining the low-dimensional feature space dataset, the feature space transformation engine 104 performs feature space transformation on the low-dimensional feature space dataset to enhance feature representation. Feature space transformation is the process of representation of the low-dimensional feature space dataset in a multi-dimensional space such that inter-variance among the data in the dataset is maximized and intra-variance among the data in the dataset is minimized. In an exemplary embodiment of the present invention, the feature space transformation engine 104 employs techniques including, but are not limited, principal component analysis, latent space modelling, variational auto encoders, Boltzmann machines, generative adversarial networks, signal decomposition, wavelet transformations, deep residual network for representation of the low-dimensional feature space dataset in a multi-dimensional space to obtain a new feature space dataset.

In various exemplary embodiments of the present invention, feature space transformation is carried out as per the requirements of quantum states as the data is eventually loaded into the quantum prediction engine 108. The output of the feature space transformation engine 104 is a new feature space dataset which is an enhanced feature space dataset as it results in optimal mapping of the data into quantum format when loaded into the quantum prediction engine 108. In an exemplary embodiment of the present invention, feature space transformation engine 104 employs techniques including, but are not limited, vector similarities, norm computations, gaussian transformation, and signal transformations for mapping the data to a suitable quantum format.

Advantageously, in accordance with an embodiment of the present invention, during the process of feature space transformation, information necessary for predictive tasks by the quantum prediction engine 108 is retained. Further, optimal mapping of data into quantum format aids in optimal processing of information by the quantum prediction engine 108 and further aids in faster training rates of the quantum prediction engine 108 due to reduced and refined feature space without any loss of information.

In an exemplary embodiment of the present invention, in the event the created feature set is associated with a classical image data, feature space transformation engine 104 performs a functional transformation on the created feature set to obtain a low-dimensional feature space dataset from the high dimensional data associated with the feature set by employing orthogonalized convolution. By employing orthogonalized convolution, the feature space transformation engine 104 generates an orthogonal feature space dataset which has a low-dimensional feature space. Subsequently, the feature space transformation engine 104 performs feature space transformation on the orthogonal feature space dataset to create a new feature space dataset.

In various exemplary embodiments of the present invention, the new feature space dataset is created such the new feature space dataset is in synchronization with the quantum prediction engine 108 onto which it would be loaded. The kernels of the new feature space dataset are transformed to a new vector set. Subsequently, a weighted average is taken of the new vector set dataset to obtain representative values corresponding to each dimension of the new feature space dataset. For textual data, the new feature space dataset is preprocessed using different methods including, but are not limited to, normalization, standardization etc. For image dataset, different preprocessing methods including, but are not limited to, rescaling and weighted averaging are applied to different channels of the image data.

In another exemplary embodiment of the present invention, in the event the created feature set is associated with a classical text data, the feature space transformation engine 104 performs a functional transformation on the created feature set to obtain a low-dimensional feature space from the high dimensional feature set by encoding the word embeddings in the created feature set into latent text features which has a low-dimensional feature space. In an exemplary embodiment of the present invention, deep learning-based encoders are employed by the feature space transformation engine 104 to encode the word embeddings into latent text without any loss of information. Further, the feature space transformation engine 104 transforms the latent text with a low-dimensional feature space into a new enhanced feature space dataset by employing a non-linear feature space transformation. The word embeddings cannot be directly fed to the quantum prediction engine 108 due to the limited availability of qubits, and advantageously, the new enhanced feature space dataset has a feature size which requires limited qubits for loading onto the quantum prediction engine 108 for carrying out predictive tasks optimally.

In an embodiment of the present invention, the batch preparation and selection engine 106 receives the new feature space dataset and samples the dataset for loading into the quantum prediction engine 108. The batch preparation and selection engine 106 optimally samples the new feature space dataset and selects batches of the sampled dataset for efficient processing of information by the quantum prediction engine 108. In various exemplary embodiments of the present invention, the batch preparation and selection engine 106 employs techniques such as, but are not limited to, mean field approximation of distributions, Markov chain Monte Carlo principles of approximation etc. for sampling the new feature space dataset. In an exemplary embodiment of the present invention, in the event the sampled dataset corresponds to classical image data, the batch preparation and selection engine 106 maintains a distribution of the entire image data in the new feature space dataset for sampling the data using generative sampling technique. The batch preparation and selection engine 106 then selects an appropriate batch of sampled data for loading into the quantum prediction engine 108. For instance, the batch preparation and selection engine 106 maintains a pattern based posterior distribution pattern for sampling the data and creates appropriate batches for selection. In another exemplary embodiment of the present invention, in the event the new feature space dataset corresponds to classical text data, the batch preparation and selection engine 106 divides the new feature space text dataset into batches once the new feature space dataset is stabilized. The batch preparation and selection engine 106 maintains a consistent distribution for optimally sampling the new feature space dataset for efficient convergence. Thereafter, the batch preparation and selection engine 106 selects the appropriate batch for loading into the quantum prediction engine 108.

In an embodiment of the present invention, the quantum prediction engine 108 receives the batches of sampled dataset from the batch preparation and selection engine 106 for processing the information in the sampled dataset for training the engine 108 to carry out predictive tasks. In an exemplary embodiment of the present invention, the quantum prediction engine 108 may be a quantum assisted machine learning system that performs predictive tasks and trains the engine 108 using back propagation. In an embodiment of the present invention, the quantum prediction engine 108 is configured to map the batches of sampled dataset into a suitable quantum format. In an exemplary embodiment of the present invention, the quantum prediction engine 108 is configured to map the batches of sampled dataset into quantum states employing quantum state preparation techniques such as, but are not limited to, angle embedding and amplitude embedding. In an embodiment of the present invention, the quantum prediction engine 108 may constitute machine learning components to prepare the sampled dataset for applying quantum state preparation techniques for mapping the sampled dataset into the quantum format. In an exemplary embodiment of the present invention, the machine learning components include, but are not limited to, SVM, Decision trees, regression and deep neural networks.

In various exemplary embodiments of the present invention, mapping the sampled dataset into quantum format includes computing various quantum parameters, including, but are not limited to, rotation angles, displacements, superposition amplitudes, and qubit amplitudes for loading the sampled dataset into quantum states. For example, mapping may be carried out by converting the sampled dataset to phases and further a phase value may be introduced as a rotation in quantum qubits for preparing quantum states in the quantum circuit 108a of the quantum prediction engine 108 to represent the data in the sampled dataset. In another example, amplitude embedding may be used by normalizing vector of the sampled dataset and the sampled dataset is loaded as amplitude of quantum qubits in the quantum circuit 108a of the quantum prediction engine 108. During the mapping process, the quantum prediction engine 108 is trained for optimally processing similar future data. Further, the training process also includes learning various classical machine learning parameters such as, distributional parameters, weight matrices, biases etc.

In an embodiment of the present invention, the quantum prediction engine 108 comprises the quantum circuit (108a) for carrying out computations associated with mapping of the sampled dataset into the quantum format. In an exemplary embodiment of the present invention, the quantum prediction engine 108 comprises one or more quantum circuits (108a). In various exemplary embodiments of the present invention, quantum circuit (108a) may be designed specific to the type of sampled dataset on which it is carrying out computation. In an exemplary embodiment of the present invention, in the event the sampled dataset corresponds to classical text data, the quantum circuit 108a is designed specific to the sampled dataset to enhance learning of text information from the sampled dataset. For instance, the quantum circuit 108a may be designed to include a standard variational quantum classifier. The quantum circuit 108a carries out the computation to generate a quantum measurement data. In an embodiment of the present invention, multiple gate based quantum circuits 108a having different combination of quantum gates including, but are not limited to, hadamard gate, rotational gates and CNOT gates may be used to design an ansatz. The quantum circuits 108a have trainable weights which introduce different variations in the quantum circuits 108a as per a specific gate in which the trainable weight is used. For example, a trainable weight may be used to cause a X-rotation in a rotational gate. In an embodiment of the present invention, multiple qubits may be used to design the quantum circuits 108a and the quantum circuits 108a may be represented using superposition between the multiple qubits. Different operations can be performed on the qubits using gates to perform certain learning tasks.

In an embodiment of the present invention, the quantum prediction engine 108 comprises a feature engineering engine 108b. The feature engineering engine 108b is configured to convert the output quantum measurement data from the quantum circuit 108a into a data format which is suitable for feeding into a deep neural network 108c of the quantum prediction engine 108. The converted data is then passed through a fully connected layer of the deep neural network 108c to obtain the required classical output data.

The deep neural network 108 c acts as a translator to convert the quantum measurement data from the quantum circuit 108a to classical output data.

In an embodiment of the present invention, the quantum prediction engine 108 comprises a cost evaluation engine 108d. The cost evaluation engine 108d is configured to compute overall cost with respect to the quantum circuit 108a and deep learning network 108c. The cost is computed based on a cost function defined in a particular predictive task. The computed cost is back propagated to the quantum circuit 108a to optimize weights of the quantum circuit 108a layers.

In an embodiment of the present invention, the feature space evaluation engine 110 is configured to evaluate performance of the system 100 and provide feedback to the feature definition engine 102 and the feature space transformation engine 104 to refine and/or redefine feature space for efficient quantum predictive tasks. The feature space evaluation engine 110 performs the feature space evaluation based on the cost evaluation data received from the cost evaluation engine 108d. In an exemplary embodiment of the present invention, feature space evaluation may be performed in a supervised or an unsupervised manner. Feature space evaluation is performed to check efficiency and depth of information in the new feature space dataset created by the feature space transformation engine 104 for a given predictive task. In an exemplary embodiment of the present invention, change in performance of predictive tasks in different new feature space datasets may act as a feature space performance measure.

In another embodiment of the present invention, the feature space evaluation engine 110 may be triggered by the feature space transformation engine 104 to evaluate suitability of the new feature space dataset created for a given predictive task. In an exemplary embodiment of the present invention, the feature space evaluation engine 110 may employ techniques, but are not limited to, topological product, normalization independent embedding quality assessment, local continuity meta-criterion from co-ranking matrix, trustworthiness and continuity measures etc. for performing the evaluation.

In an embodiment of the present invention, in the event performance of the new feature space dataset is determined to be below a pre-determined acceptable criterion, feature space refinement is proposed. The pre-determined acceptance criterion may be set based on user needs and prioritizations. In an example embodiment, the acceptance criteria may include enhancing the new feature space dataset with a new batch of transformed feature data in tandem with historical performance. In an embodiment of the present invention, in the event feature space refinement is carried out, the created new feature space dataset may be refined by adding new features, redefining existing features, and/or modifying the transformations in the feature set created by the feature definition engine 102. In another embodiment of the present invention, the feature space refinement is carried out by adding, modifying, deleting dimensions in the new feature space dataset based upon the feature space evaluation by the feature space transformation engine 104. In an exemplary embodiment of the present invention, techniques such as, but not limited to, regularization approaches, network expansion, retraining, residual neural networks, neurogenesis deep learning, self-organizing networks etc. may be employed for carrying out refining of the new feature space dataset.

In various embodiment of the present invention, feature space evaluation engine 110 continuously evaluates and provides feedback to the feature definition engine 102 and the feature space transformation engine 104 for iteratively refining the created new feature space such that the new feature space dataset fits optimally for quantum prediction requirements. The feedback and refinement are provided both in supervised as well as unsupervised modes making it adaptive to the quantum prediction engine 108. Based upon the feedback received from the feature space evaluation engine 110, the feature space transformation engine 104 enhances the new feature space dataset for better feature representation in the quantum prediction engine 108.

Figure 2:
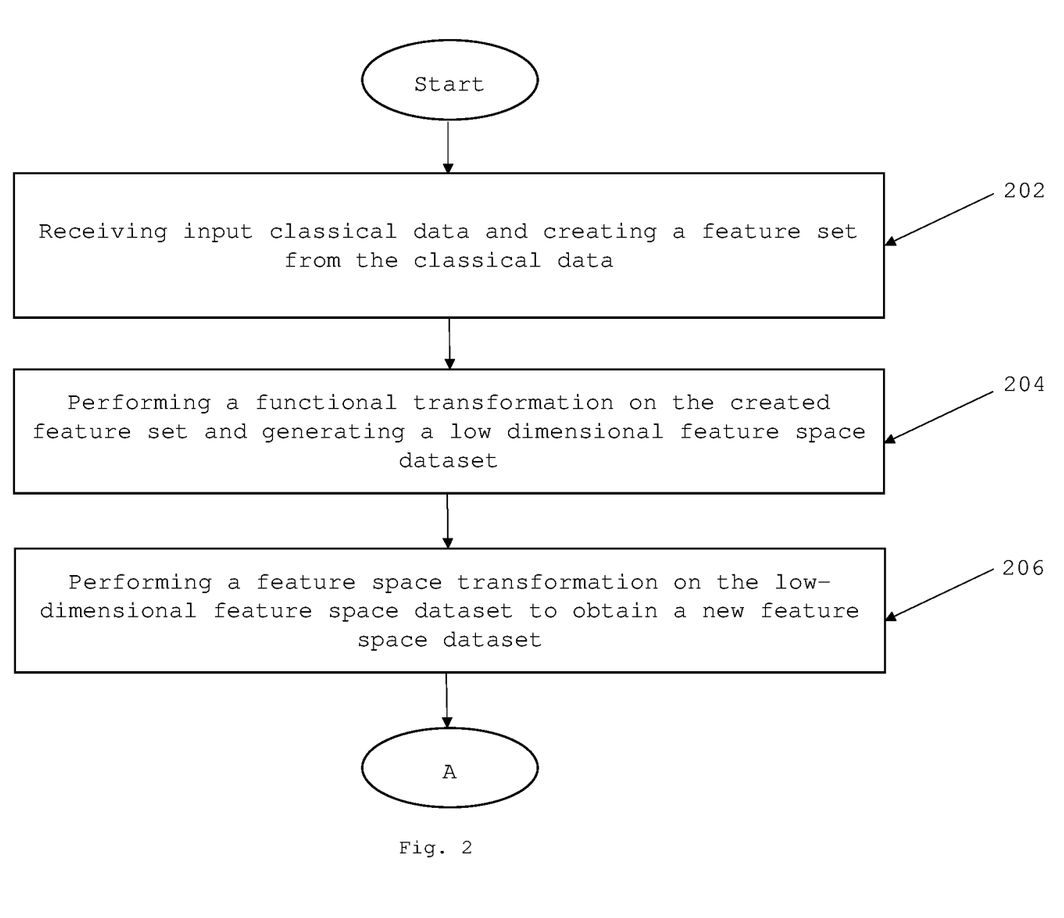
FIGS. 2, 2A depict a flowchart illustrating a method for optimized processing of information on quantum systems, in accordance with an embodiment of the present invention.
Figure 2A:
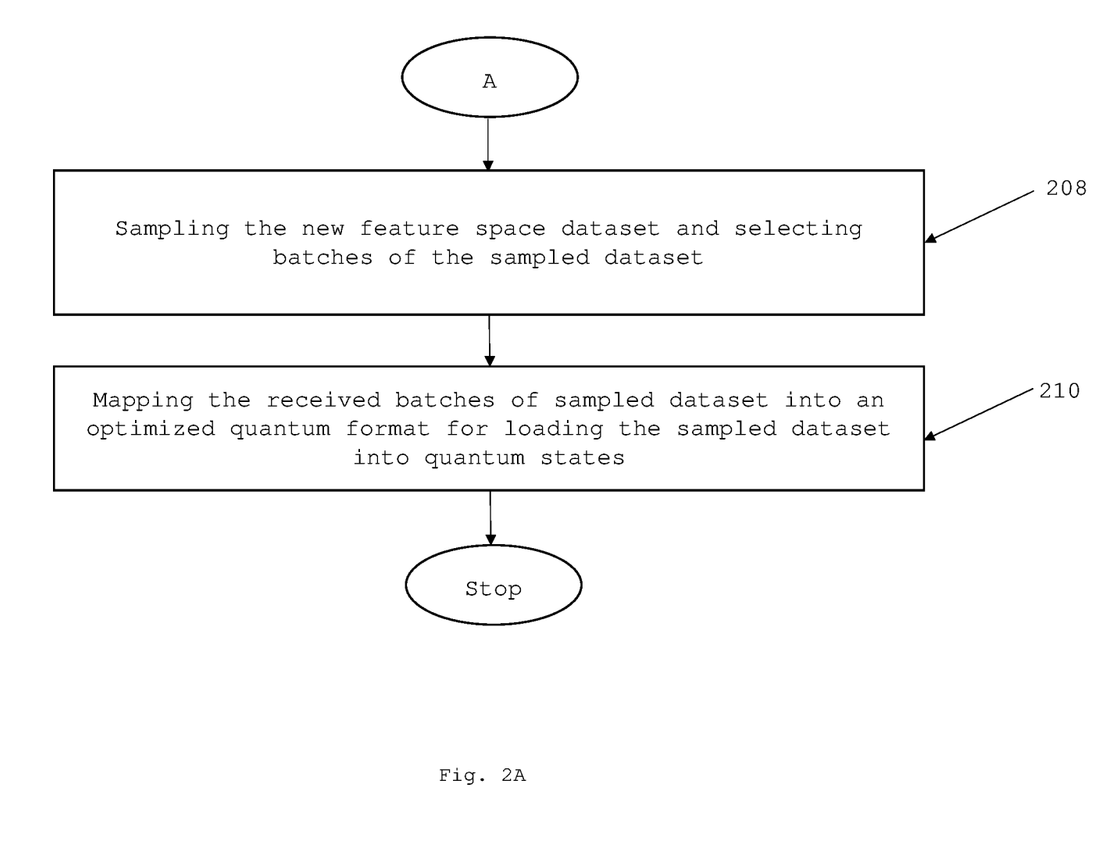

FIGS. 2, 2A depicts a flowchart illustrating a method for optimized processing of information on quantum systems, in accordance with an embodiment of the present invention.

At step 202, an input classical data is received and a feature set is created from the classical data. In an exemplary embodiment of the present invention, the classical data received is in the form of images and converted into an array of pixels. The array of pixels is generated by extrapolating pixel values from the received image. The array of pixels is processed by transforming the pixels through rescaling and converting the pixels to a grayscale. Further, the transformed pixels are processed by flattening the pixel arrays which constitutes a series of operations including, but are not limited to, normalization of the pixel information, logarithmic transformation of the pixels, and binarization of the pixels. The feature set is created based on an analysis of the pixel values that represent various attributes of the image. In an exemplary embodiment of the present invention, the classical data may include features extracted from machine learning tasks such as deep neural networks, clustering algorithms etc. and feature sets are created by processing the extracted features received as classical data. In an example embodiment, the extracted features from machine learning tasks may include features related to images.

In another exemplary embodiment of the present invention, the classical data received is in the form of text. The text data is received and a feature set is created by converting the text data into a numeric type using word embeddings. The word embeddings is performed by assigning random numerical values to elements of the text data and using a machine learning or deep learning model to identify relation between the random numerical values in the context of usage of the text elements in the input classical data. The text elements are then represented by numerical values and association between the numerical values is learnt by a machine learning or deep learning model using trainable weights. In an exemplary embodiment of the present invention, the text elements may be words, sentences, phrases etc. and strategies used to learn embedding including, but are not limited to, bag-of-word approach and skip-gram approach.

In an embodiment of the present invention, the created feature set is de-noised for removing unwanted noisy data, sharp edges and blurry pixels from the feature set. Feature de-noising is carried out to refine the created feature set to suit predictive tasks to be performed by the quantum prediction engine 108, in accordance with an embodiment of the present invention. In various exemplary embodiments of the present invention, feature de-noising may include techniques such as, thresholding, filtering, discretizing, etc.

At step 204, a functional transformation is performed on the created feature set to generate a low dimensional feature space dataset. In an embodiment of the present invention, functional transformation on the created feature set is performed by deriving abstract features of low-dimensional feature space from the created feature set. In various exemplary embodiments of the present invention, various techniques such as, but are not limited to, feature manifold learning, kernel methods, and response based techniques may be employed for performing functional transformation on the created feature set. In various embodiments of the present invention, the functional transformation is performed to reduce a high-dimensional data associated with the feature set to a low-dimensional feature space dataset without loss of information. In an exemplary embodiment of the present invention, the transformed low-dimensional feature space dataset is obtained by approximating distribution of data of the high-dimensional data associated with the feature set. The approximation of the distribution of data is carried out based on specific predictive tasks. Advantageously, the low-dimensional feature space dataset helps in improving efficiency of the quantum system by reducing the dimensionality of dataset or compressing the dataset. Based on objective of the tasks associated with the quantum circuit, dimensionality reduction is carried out by strategic learning and by approximating the high-dimensional data distribution. For example, if the non-linearity in data is high, then methods including, but are not limited to, kernel methods and manifold learning methods are used to reduce the dimensionality. In another example, if the linearity is high then methods including, but are not limited to, principle component analysis, multi-correspondence analysis, multi-factor analysis may be used to support learning efficiency of quantum circuit to reduce the dimensionality.

In an exemplary embodiment of the present invention, in the event the created feature set is associated with a classical image data, a functional transformation is performed on the created feature set to obtain a low-dimensional feature space from the high dimensional feature set by employing orthogonalized convolution. By employing orthogonalized convolution, an orthogonal feature space dataset is generated which has a low-dimensional feature space.

In another exemplary embodiment of the present invention, in the event the created feature set is associated with a classical text data, a functional transformation is performed on the created feature set to obtain a low-dimensional feature space from the high dimensional feature set by encoding the word embeddings in the created feature set into latent text features which has a low-dimensional feature space. In an exemplary embodiment of the present invention, deep learning-based encoders are employed to encode the word embeddings into latent text without any loss of information.

At step 206, a feature space transformation is performed on the low-dimensional feature space dataset to obtain a new feature space dataset. In an embodiment of the present invention, subsequent to obtaining the low-dimensional feature space dataset, feature space transformation is performed on the low-dimensional feature space dataset to obtain the new feature space dataset with enhanced feature representation. Feature space transformation is a process of representation of the low-dimensional feature space dataset in a multi-dimensional space such that inter-variance among the data in the dataset is maximized and intra-variance among the data in the dataset is minimized.

In an exemplary embodiment of the present invention, in the event an orthogonal feature space dataset is generated as a low-dimensional feature space corresponding to a classical image data, feature space transformation is performed on the orthogonal feature space dataset to create the new feature space dataset.

In an exemplary embodiment of the present invention, in the event a latent text is generated as a low-dimensional feature space corresponding to a classical text data, feature space transformation is performed by employing a non-linear feature space transformation to create the new feature space dataset.

In various exemplary embodiments of the present invention, feature space transformation is carried out as per requirements of quantum states. The created new feature space dataset with enhanced feature space results in optimal mapping of the data into a quantum format-the mapping step is explained in the later part of the specification.

At step 208, the new feature space dataset is sampled and batches of the sampled dataset are selected. In an embodiment of the present invention, the new feature space dataset is optimally sampled and batches of the sampled dataset are selected for efficient processing of information. In various exemplary embodiments of the present invention, techniques including, but are not limited to, mean field approximation of distributions, Markov chain Monte Carlo principles of approximation etc. are employed for sampling the new feature space dataset.

In an exemplary embodiment of the present invention, in the event the sampled dataset corresponds to classical image data, a distribution of the entire image data is maintained in the new feature space dataset for sampling the data using generative sampling technique. For instance, a pattern based posterior distribution pattern is maintained for sampling the data and appropriate batches are created for selection. In another exemplary embodiment of the present invention, in the event the new feature space dataset corresponds to classical text data, the new feature space text dataset is divided into batches once the new feature space dataset is stabilized. Further, a consistent distribution for optimally sampling the new feature space dataset is maintained for efficient convergence. In an embodiment of the present invention, kernels of the new feature space dataset are transformed to a new vector set and a weighted average is taken of the new vector set dataset to obtain representative values corresponding to each dimension of the new feature space dataset.

At step 210, the received batches of sampled dataset are mapped into an optimized quantum format for loading the sampled dataset into quantum states. In an embodiment of the present invention, the batches of sampled dataset are received and mapped into quantum states employing quantum state preparation techniques such as, but are not limited to, angle embedding and amplitude embedding. In an exemplary embodiment of the present invention, various techniques are employed including, but are not limited, vector similarities, norm computations, gaussian transformation, and signal transformations for mapping the data to a suitable quantum format.

In an exemplary embodiment of the present invention, machine learning components are used to prepare the sampled dataset for applying quantum state preparation techniques for mapping the sampled dataset into the quantum format. Examples of the machine learning components include, but are not limited to, SVM, Decision trees, regression, and deep neural networks.

In various exemplary embodiments of the present invention, mapping the sampled dataset into the quantum format includes computing various quantum parameters by the quantum circuit, including, but not limited to, rotation angles, displacements, superposition amplitudes, and qubit amplitudes for loading the sampled dataset into quantum states. For example, mapping may be carried out by converting the sampled dataset to phases and further a phase value may be introduced as a rotation in quantum qubits for preparing quantum states in the quantum circuit to represent the data in the sampled dataset. In another example, amplitude embedding may be used by normalizing vector of the sampled dataset and the sampled dataset is loaded as amplitude of quantum qubits in the quantum circuit. The quantum circuit carries out the computation to generate a quantum measurement data.

In an embodiment of the present invention, the output quantum measurement data is converted into a data format which is suitable for feeding into a deep neural network. The converted data is then passed through a fully connected layer to obtain a classical output data. The deep neural network acts as a translator to convert the quantum measurement data to a classical output data. Further, overall cost associated with quantum circuit and deep learning network is computed based on a cost function defined in a particular predictive task. The computed cost is back propagated to the quantum circuit to optimize weights of the quantum circuit layers.

In an embodiment of the present invention, feedback is provided continuously to refine and redefine the new feature space dataset for efficient quantum predictive tasks. Feature space evaluation is performed to check efficiency and depth of information in the new feature space dataset for a given predictive task. In an exemplary embodiment of the present invention, change in performance of predictive tasks in different new feature space datasets may act as a feature space performance measure.

In an embodiment of the present invention, in the event performance of the new feature space dataset is determined to be below a pre-determined acceptable criterion, feature space refinement is carried out. The pre-determined acceptance criterion may be set based on user needs and prioritizations. In an example embodiment, the acceptance criteria may include enhancing the new feature space dataset with a new batch of transformed feature data in tandem with historical performances. In an embodiment of the present invention, in the event a feature space refinement is carried out, the created new feature space dataset may be refined by adding new features, redefining existing features, and/or modifying the transformations in the new feature space dataset. In another embodiment of the present invention, feature space refinement is carried out by adding, modifying, deleting dimensions in the new feature space dataset based upon the feature space evaluation.

Advantageously, in accordance with various embodiments of the present invention, continuous and adaptive enhancement of feature space preparation for quantum assisted machine learning tasks makes the system 100 more efficient for quantum prediction tasks. Further, the system 100 provides for reduced cost due to requirement of fewer qubits as effective feature space significantly reduces the need for higher configuration quantum systems due to increased data encoding efficiencies. Further, the system 100 provides for reduced training time as effective feature space transformation of classical data is suitable for given quantum prediction task thereby enabling optimal application of quantum properties such as superposition, entanglement, and/or tunneling. The system 100 further provides for effective batch selection and sampling methodologies which accelerates the process of information processing by quantum systems. Furthermore, the system 100 provides for preparing feature space specific to a given predictive task, which makes the process more outcome oriented and suitable for quantum tasks. The system 100 further provides for efficiently processing a large amount of classical data as it simultaneously learns data patterns as well as quantum predictive models in an iterative mode, making the task less complex. The system 100 does not require complete data to be inputted onto the quantum prediction engine 108 at once. Finally, the system 100 operates efficiently with changing data patterns in the input classical data. Enhancing the feature space with new data in tandem with historical data patterns makes the system 100 more consistent in delivering effective encoding.

Figure 3:
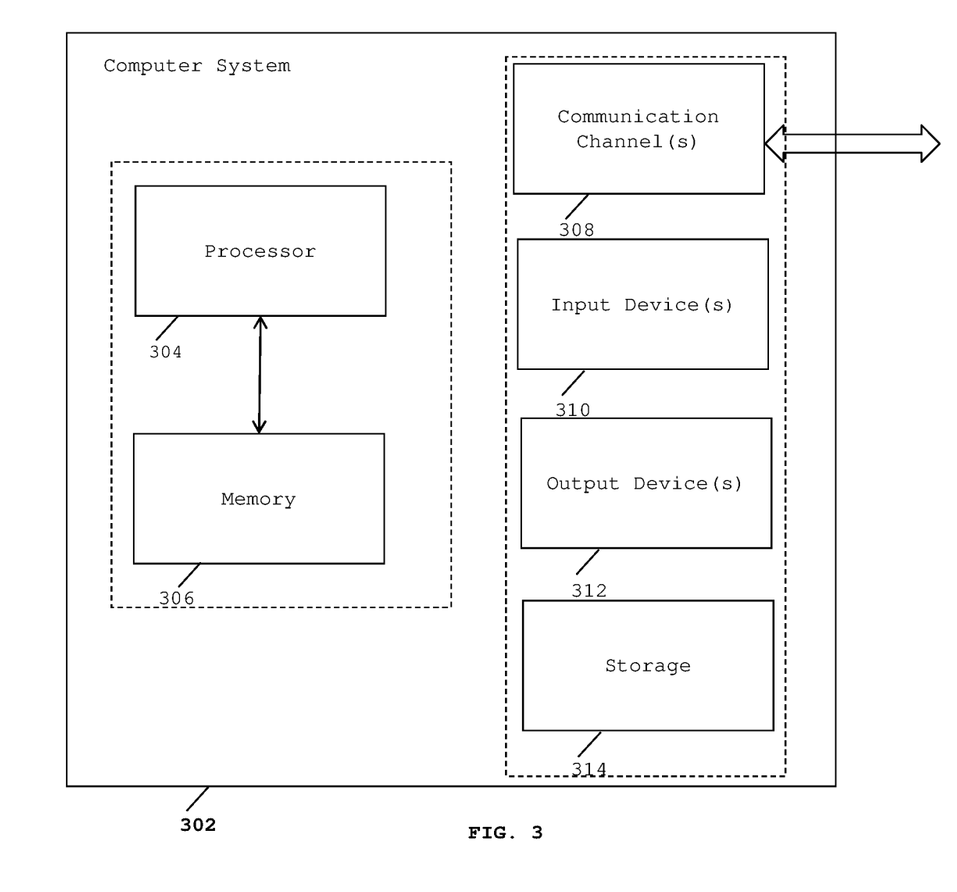
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various software executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for improved representation of classical data on quantum systems, wherein the system comprises:
   a memory storing program instructions;
   a processor executing program instructions stored in the memory; and
   a feature definition engine configured to receive input classical data and create a feature set from the classical data; a feature space transformation engine configured to:
   perform a functional transformation on the created feature set to reduce high dimensional data associated with the feature set and generate a low dimensional feature space dataset without loss of information; and
   perform a feature space transformation on the low-dimensional feature space dataset to obtain a new feature space dataset with enhanced feature representation of the low-dimensional feature space dataset in a multi-dimensional space, wherein the new feature space dataset results in optimal mapping of the input classical data into a quantum format;
   a batch preparation and selection engine configured to optimally sample the new feature space dataset and select batches of the sampled dataset; and
   a quantum prediction engine configured to map the received batches of sampled dataset into an optimized quantum format for loading the sampled dataset into quantum states, wherein the quantum prediction engine comprises:
      a feature engineering engine configured to convert an output quantum measurement data generated by a computation associated with the mapping by quantum circuits into a data format for feeding into a deep neural network of the quantum prediction engine, the converted data is passed through a fully connected layer of the deep neural network to obtain a classical output data; and
      a feature space evaluation engine configured to evaluate performance of the system and provide feedback to the feature definition engine and the feature space transformation engine continuously for iteratively refining and redefining the obtained new feature space dataset for efficient quantum predictive tasks.

2. The system as claimed in claim 1, wherein the feature definition engine is configured to:
   receive the input classical data as image data and convert the image data into an array of pixels, wherein the array of pixels is generated by extrapolating pixel values from the received image data;
   transform the array of pixels through rescaling and convert the pixels to a grayscale;
   process the transformed pixel array by flattening the pixel array, wherein the flattening of the pixel array includes normalization of pixel information associated with the pixel array, logarithmic transformation of the pixel array, and binarization of the pixel array; and
   create the feature set based on analysis of pixel values in the pixel array that represent various attributes of the image.

3. The system as claimed in claim 1, wherein the feature definition engine is configured to:
   receive the input classical data as text data and create a feature set by converting the text data into a numeric type using word embedding, wherein the word embedding is performed by assigning random numerical values to elements of the text data; and
   identify relation between the assigned random numerical values in the context of usage of the text elements using a machine learning or deep learning model; and
   represent the text elements by numerical values and learn association between the numerical values and the text elements by the machine learning or deep learning model using trainable weights.

4. The system as claimed in claim 1, wherein the feature definition engine is configured to de-noise the created feature set for removing unwanted noisy data, sharp edges and blurry pixels to refine the created feature set to suit predictive tasks carried out by the quantum prediction engine.

5. The system as claimed in claim 1, wherein the feature space transformation engine is configured to perform the functional transformation on the created feature set by deriving features of low-dimensional feature space from the created feature set.

6. The system as claimed in claim 1, wherein the feature space transformation engine is configured to obtain the transformed low-dimensional feature space dataset by approximating distribution of data of the high-dimensional data associated with the feature set, wherein the approximation is carried out based on specific predictive tasks to be carried out by the quantum prediction engine, and wherein based on the specific predictive task dimensionality reduction of the low-dimensional feature space dataset is carried out.

7. The system as claimed in claim 6, wherein the feature space transformation engine reduces the dimensionality by employing kernel methods and manifold learning methods in the event it is determined that non-linearity in data is high, and in the event it is determined that linearity in data is high then techniques such as principle component analysis, multi-correspondence analysis, multifactor analysis are employed to reduce the dimensionality.

8. The system as claimed in claim 1, wherein the feature space transformation engine obtains the enhanced feature representation of the low-dimensional feature space dataset in a multi-dimensional space such that inter-variance among the data in the dataset is maximized and intra-variance among the data in the dataset is minimized.

9. The system as claimed in claim 2, wherein the feature space transformation engine obtains the low-dimensional feature space dataset corresponding to the classical input image data by employing orthogonalized convolution to generate an orthogonal feature space dataset and performs the functional transformation on the orthogonal feature space dataset to obtain the new feature space dataset.

10. The system as claimed in claim 3, wherein the feature space transformation engine obtains the low-dimensional feature space dataset corresponding to the classical input text data by encoding the word embedding in the created feature set into latent text features, and wherein the feature space transformation engine transforms the latent text into the new enhanced feature space dataset by employing a non-linear feature space transformation.

11. The system as claimed in claim 1, wherein the feature space transformation engine creates the new feature space dataset such the new feature space dataset is in synchronization with the quantum prediction engine, wherein kernels of the new feature space dataset are transformed to a new vector set and a weighted average is taken of the new vector set dataset to obtain representative values corresponding to each dimension of the new feature space dataset.

12. The system as claimed in claim 1, wherein the batch preparation and selection engine maintains a consistent distribution for optimally sampling the new feature space dataset to create the sampled dataset for efficient convergence.

13. The system as claimed in claim 2, wherein the batch preparation and selection engine is configured to maintain a pattern based posterior distribution pattern in the new feature space dataset to create the sampled dataset and creates appropriate batches for the selection, in the event the new feature space dataset corresponds to the input classical image data.

14. The system as claimed in claim 3, wherein the batch preparation and selection engine is configured to divide the new feature space dataset into batches once the new feature space dataset is stabilized and creates appropriate batches for the selection, in the event the new feature space dataset corresponds to the input classical text data.

15. The system as claimed in claim 1, wherein the quantum prediction engine is continuously trained during the mapping operation for quantum assisted machine learning tasks, and wherein the training includes learning various classical machine learning parameters including distributional parameters, weight matrices, and biases.

16. The system as claimed in claim 1, wherein the quantum prediction engine is configured to map the batches of sampled dataset into quantum states by employing quantum state preparation techniques such as angle embedding, and amplitude embedding, wherein the quantum prediction engine comprises machine learning components to prepare the sampled dataset for applying quantum state principles for mapping the sampled dataset into the quantum format.

17. The system as claimed in claim 1, wherein the quantum prediction engine is configured to map the sampled dataset into the quantum format by employing quantum parameters such as rotation angles, displacements, superposition amplitudes, and qubit amplitudes for loading the sampled dataset into quantum states.

18. The system as claimed in claim 1, wherein the quantum prediction engine is configured to map the sampled dataset into the quantum format by converting the sampled dataset to phases, and wherein a phase value is introduced as a rotation in quantum qubits for preparing quantum states in a quantum circuit of the quantum prediction engine to represent data in the sampled dataset.

19. The system as claimed in claim 1, wherein the quantum prediction engine is configured to map the sampled dataset into the quantum format by employing amplitude embedding that includes normalizing vector of the sampled dataset for loading the sampled dataset as amplitude of quantum qubits in a quantum circuit of the quantum prediction engine.

20. The system as claimed in claim 1, wherein the quantum prediction engine comprises one or more quantum circuits for carrying out computations associated with mapping of the sampled dataset into the quantum format to obtain an output quantum measurement data, the quantum circuits having trainable weights for introducing different variations in the quantum circuits as per a specific gate of the quantum circuits in which the trainable weights are used.

21. The system as claimed in claim 20, wherein the quantum circuits are designed specific to a type of the sampled dataset on which it is carrying out computation, and wherein multiple qubits are used to design the quantum circuits and the quantum circuits are represented using superposition between the multiple qubits, and wherein different operations are performed on the qubits using gates to perform learning tasks.

22. The system as claimed in claim 1, wherein the evaluation is carried out to check efficiency and depth of information in the new feature space dataset created by the feature space transformation engine for a given predictive task.

23. The system as claimed in claim 22, wherein the feature space evaluation engine performs a feature space refinement in the event performance of the new feature space dataset is determined to be below a pre-determined acceptable criterion, the acceptance criteria may include enhancing the new feature space dataset with a new batch of transformed feature data in tandem with a historical performance.

24. The system as claimed in claim 22, wherein the feature space evaluation engine refines the created new feature space dataset by adding new features, redefining existing features, and/or modifying the transformations in the new feature space dataset or by adding, modifying, deleting dimensions in the new feature space dataset, and wherein regularization approaches, network expansion, retraining, residual neural networks, neurogenesis deep learning, self-organizing networks are employed for carrying out the refining of the new feature space dataset.

25. A method for improved representation of classical data on quantum systems, the method is executed by a processor executing program instructions stored in a memory, the method comprising:
receiving input classical data and creating a feature set from the classical data;
performing a functional transformation on the created feature set to reduce high dimensional data associated with the feature set and generating a low dimensional feature space dataset without loss of information;
performing a feature space transformation on the low-dimensional feature space dataset to obtain a new feature space dataset with enhanced feature representation of the low-dimensional feature space dataset in a multi-dimensional space, wherein the new feature space dataset results in optimal mapping of the input classical data into a quantum format;
sampling the new feature space dataset and selecting batches of the sampled dataset;
mapping the received batches of sampled dataset into an optimized quantum format for loading the sampled dataset into quantum states, wherein an output quantum measurement data generated by a computation associated with the mapping by quantum circuits is converted into a data format for feeding into a deep neural network, the converted data is passed through a fully connected layer of the deep neural network to obtain a classical output data; and evaluating performance of the system and provide a continuous feedback for iteratively refining and redefining the obtained new feature space dataset for efficient quantum predictive tasks.

26. The method as claimed in claim 25, wherein the step of receiving input classical data comprises:

receiving the input classical data as image data and converting the image data into an array of pixels, wherein the array of pixels is generated by extrapolating pixel values from the received image data;

transforming the array of pixels through rescaling and converting the pixels to a grayscale;

processing the transformed pixel array by flattening the pixel array, wherein the flattening of the pixel array includes normalization of pixel information associated with the pixel array, logarithmic transformation of the pixel array, and binarization of the pixel array; and creating the feature set based on analysis of pixel values in the pixel array that represent various attributes of the image.

27. The method as claimed in claim 25, wherein the step of receiving input classical data comprises:

receiving the input classical data as text data and creating a feature set by converting the text data into a numeric type using word embedding, wherein the word embedding is performed by assigning random numerical values to elements of the text data; and identifying relation between the assigned random numerical values in the context of usage of the text elements using a machine learning or deep learning model; and representing the text elements by numerical values and learn association between the numerical values and the text elements by the machine learning or deep learning model using trainable weights.

28. The method as claimed in claim 25, wherein the functional transformation on the created feature set is performed by deriving features of low-dimensional feature space from the created feature set, wherein the derivation operation is carried out by one or more of manifold learning methods, kernel methods, and response based techniques.

29. The method as claimed in claim 25, wherein the transformed low-dimensional feature space dataset is obtained by approximating distribution of data of the high-dimensional data associated with the feature set, wherein the approximation is carried out based on specific predictive tasks to be carried out, and wherein based on the specific predictive task dimensionality reduction of the low-dimensional feature space dataset is carried out.

30. The method as claimed in claim 25, wherein the enhanced feature representation of the low-dimensional feature space dataset is obtained in a multi-dimensional space such that inter-variance among the data in the dataset is maximized and intra-variance among the data in the dataset is minimized.

31. The method as claimed in claim 25, wherein a consistent distribution is maintained for optimally sampling the new feature space dataset to create the sampled dataset for efficient convergence.

32. The method as claimed in claim 25, wherein the sampled dataset is mapped into the quantum format by employing quantum parameters such as rotation angles, displacements, superposition amplitudes, and qubit amplitude for loading the sampled dataset into quantum states.

33. The method as claimed in claim 25, wherein the sampled dataset is mapped into the quantum format by converting the sampled dataset to phases, and wherein a phase value is introduced as a rotation in quantum qubits for preparing quantum states in a quantum circuit to represent data in the sampled dataset.

34. The method as claimed in claim 25, wherein the sampled dataset is mapped into the quantum format by employing amplitude embedding that includes normalizing vector of the sampled dataset for loading the sampled dataset as amplitude of quantum qubits in the quantum circuit.

35. The method as claimed in claim 25, wherein the method comprises carrying out computations associated with mapping of the sampled dataset, by a quantum circuit, into the quantum format to obtain an output quantum measurement data, the quantum circuits having trainable weights for introducing different variations in the quantum circuits as per a specific gate of the quantum circuits in which the trainable weights are used.

36. The method as claimed in claim 25, wherein the evaluation is carried out to check efficiency and depth of information in the new feature space dataset for a given predictive task.

37. The method as claimed in claim 36, wherein the method comprises performing a feature space refinement in the event performance of the new feature space dataset is determined to be below a pre-determined acceptable criterion, the acceptance criteria may include enhancing the new feature space dataset with a new batch of transformed feature data in tandem with a historical performance.

38. A computer program product comprising:

a non-transitory computer readable medium having computer-readable program code stored thereon, the computer readable program code comprising instructions that, when executed by a processor, cause the processor to:

receive input classical data and create a feature set from the classical data;

perform a functional transformation on the created feature set to reduce high dimensional data associated with the feature set and generate a low dimensional feature space dataset without loss of information;

perform a feature space transformation on the low-dimensional feature space dataset to obtain a new feature space dataset with enhanced feature representation of the low-dimensional feature space dataset in a multi-dimensional space, wherein the new feature space dataset results in optimal mapping of the input classical data into a quantum format;

sample the new feature space dataset and select batches of the sampled dataset;

map the received batches of sampled dataset into an optimized quantum format for loading the sampled dataset into quantum states, wherein an output quantum measurement data generated by a computation associated with the mapping by quantum circuits is converted into a data format for feeding into a deep neural network, the converted data is passed through a fully connected layer of the deep neural network to obtain a classical output data; and evaluate performance of the system and provide a continuous feedback for iteratively refining and redefining the obtained new feature space dataset for efficient quantum predictive tasks.

* * * * *